US007308275B2

(12) United States Patent
Cole et al.

(10) Patent No.: US 7,308,275 B2
(45) Date of Patent: Dec. 11, 2007

(54) HIGH-RATE PROXIMITY DETECTION WITH THE ABILITY TO PROVIDE NOTIFICATION

(75) Inventors: Alan George Cole, Katonah, NY (US); Sastry S. Duri, Yorktown Heights, NY (US); Vineet Kumar Gupta, Urbana, IL (US); Jonathan Paul Munson, Putnam Valley, NY (US); David Alvra Wood, III, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/526,443

(22) Filed: Sep. 25, 2006

(65) Prior Publication Data

US 2007/0021128 A1  Jan. 25, 2007

Related U.S. Application Data

(63) Continuation of application No. 10/315,651, filed on Dec. 10, 2002, now Pat. No. 7,136,658.

(51) Int. Cl.
*H04Q 7/20* (2006.01)
(52) U.S. Cl. ............................ 455/456.1; 455/456.3
(58) Field of Classification Search ............ 455/456.1, 455/456.2, 456.3, 421, 422.1, 426.1, 426.2, 455/414.1, 414.2, 557; 340/10.2, 5.8, 10.1, 340/572.1; 707/200; 709/240, 225, 203; 705/14

See application file for complete search history.

(56) References Cited

U.S. PATENT DOCUMENTS 5,060,165 A  10/1991  Schumacher et al.

(Continued)

FOREIGN PATENT DOCUMENTS

DE  100 56 519 A1  11/2000

(Continued)

OTHER PUBLICATIONS

"Profilium Pinpoint," http://www.profilium.com/solutions/pinpoint.html, downloaded Apr. 3, 2003.

(Continued)

*Primary Examiner*—Jean Gelin
(74) *Attorney, Agent, or Firm*—Ryan, Mason & Lewis, LLP; Douglas W. Cameron, Esq.

(57) ABSTRACT

Techniques are presented for identifying mobile devices within a coverage region of a wireless station. Positions for mobile devices, if any, within the coverage region are determined. It is then determined whether the positions are within one or more defined areas, called "notification areas" herein. Additionally, selected mobile devices within notification areas are sent messages. The selected mobile devices are selected via certain criteria, including, for instance, campaign specifications and subscriber information. A message can be sent to a mobile device if the subscriber corresponding to the mobile device has indicated an acceptance of a category of notifications for the message and for the publisher who is publishing the notifications. The category could be traffic conditions and the publisher could be a Department of Transportation having responsibility for a particular freeway. These are two examples of multiple criteria for selecting mobile devices to which messages could be sent.

23 Claims, 8 Drawing Sheets

U.S. PATENT DOCUMENTS

| | | | |
|---|---|---|---|
| 5,686,902 A * | 11/1997 | Reis et al. ................. | 340/10.2 |
| 5,771,381 A | 6/1998 | Jones et al. | |
| 5,819,284 A | 10/1998 | Farber et al. | |
| 5,920,818 A * | 7/1999 | Frodigh et al. ............. | 455/443 |
| 5,926,761 A * | 7/1999 | Reed et al. ................. | 455/440 |
| 5,974,300 A | 10/1999 | LaPorta et al. | |
| 6,021,123 A * | 2/2000 | Mimura ...................... | 370/331 |
| 6,044,224 A | 3/2000 | Radia et al. | |
| 6,088,598 A | 7/2000 | Marsolais | |
| 6,182,087 B1 | 1/2001 | Lim | |
| 6,236,978 B1 | 5/2001 | Tuzhilm | |
| 6,336,035 B1 | 1/2002 | Somoza et al. | |
| 6,356,762 B1 * | 3/2002 | Guenther ................. | 455/456.4 |
| 6,400,944 B1 | 6/2002 | Alperovich et al. | |
| 6,516,190 B1 * | 2/2003 | Linkola ...................... | 455/408 |
| 2002/0007468 A1 | 1/2002 | Kampe et al. | |
| 2002/0059449 A1 * | 5/2002 | Wandel et al. .............. | 709/238 |
| 2002/0062263 A1 * | 5/2002 | Katou ......................... | 705/26 |
| 2002/0086680 A1 * | 7/2002 | Hunzinger .................. | 455/456 |
| 2002/0091711 A1 * | 7/2002 | Ericson ...................... | 707/200 |
| 2002/0115437 A1 * | 8/2002 | Fukui et al. ................ | 455/435 |
| 2002/0155844 A1 | 10/2002 | Rankin et al. | |
| 2002/0193121 A1 * | 12/2002 | Nowak et al. .............. | 455/456 |
| 2003/0004802 A1 * | 1/2003 | Callegari .................... | 705/14 |
| 2003/0060205 A1 * | 3/2003 | Shapira ....................... | 455/446 |
| 2003/0128100 A1 * | 7/2003 | Burkhardt et al. ........... | 340/5.8 |
| 2003/0231655 A1 * | 12/2003 | Kelton et al. ................ | 370/468 |
| 2004/0120323 A1 * | 6/2004 | Viikari et al. ............ | 370/395.5 |
| 2004/0198390 A1 * | 10/2004 | Kaise ....................... | 455/456.1 |
| 2005/0043037 A1 * | 2/2005 | Ioppe et al. ............. | 455/456.1 |

FOREIGN PATENT DOCUMENTS

| | | |
|---|---|---|
| EP | 1 041 831 A1 | 10/2000 |
| EP | 1 069 792 A1 | 1/2001 |
| WO | WO 00 79811 A1 | 12/2000 |

OTHER PUBLICATIONS

"Profilium: Infrastructure: Triggers," http://www.profilium.com/infra/triggers.html, downloaded Apr. 3, 2003.

"Profilium: Infrastructure: Services—Features," http://www.profilium.com/infra/features.html, downloaded Apr. 3, 2003.

"Department of Defense Solutions," An ispheres White Paper, no date.

"iSpheres Halo: Real-Time Event Server; Event Management and Alerting System for the Adaptive Enterprise," no date.

Technical White Paper, Event Server Architecture, no date.

"Profilium Pinpoint," http://www.profilium.com/solutions/pinpoint.html, downloaded Apr. 3, 2003.

"Profilium: Infrastructure: Triggers," http://www.profilium com/infra/triggers.html, downloaded Apr. 3, 2003.

"Profilium: Infrastructure: Services—Features," http://www.profilium.com/infra/features.html, downloaded Apr. 3, 2003.

"Department of Defense Solutions," An ispheres White Paper.

"iSpheres Halo: Real-Time Event Server; Event Management and Alerting System for the Adaptive Enterprise,".

Technical White Paper, Event Server Architecture.

* cited by examiner

| PDS | PDS INFORMATION | |
|---|---|---|
| | COVERAGE REGION | NETWORK ADDRESS |
| PDS 1 | AREA BETWEEN COORDINATES 1...X | 192.168.168.1 |
| PDS 2 | AREA BETWEEN COORDINATES 1...Y | 192.168.0.1 |

| PUBLISHER ID | CAMPAIGN SPECIFICATIONS |||
| --- | --- | --- | --- |
| | CAMPAIGN ID | NOTIFICATION AREA(S) | MESSAGE |
| DOT | I-287 BLASTING | I-287 BETWEEN EXITS A AND B; AREA BETWEEN COORDINATES 1 . . . N | BLASTING ON I-287 BETWEEN EXITS A AND B |
| DOT | PARKWAY ACCIDENT | AREA BETWEEN COORDINATES 1 . . . M | ACCIDENT NEAR EXIT Z; AVOID PARKWAY BETWEEN EXITS X AND Z |
| MALL A | NEW STORE | AREA BETWEEN COORDINATES 1 . . . P | MALL A IS PROUD TO ANNOUNCE THE GRAND OPENING OF STORE K, OFFERING 15 % OFF |
| PUBLISHER A | COUPONS | AREA BETWEEN COORDINATES 1 . . . Q | GAS STATION H OFFERS A FREE CAR WASH WITH FILL UP |

FIG. 5A

| CAMPAIGN SPECIFICATIONS | | | | |
|---|---|---|---|---|
| MESSAGE METHOD | START TIME | STOP TIME | CATEGORIES | MESSAGE CUSTOMIZATION |
| SMS | DECEMBER 12, 0700 | DECEMBER 12, 1500 | TRAFFIC | NONE |
| SMS | DECEMBER 12, 1500 | DECEMBER 12, 1600 | TRAFFIC, EMERGENCY | NONE |
| WAP | DECEMBER 10, 1100 | DECEMBER 24, 2100 | COMMECIAL | MESSAGE WITH MAP |
| WAP | DECEMBER 1, 0000 | NONE | COMMERCIAL, PROMOTIONAL | MESSAGE WITH COUPON |

| SUBSCRIBER PREFERENCES | | | | |
|---|---|---|---|---|
| SUBSCRIBER | ACCEPTED CATEGORIES | BLOCKED PUBLISHERS | ACCEPTED PUBLISHERS | ACCEPTED CAMPAIGNS |
| SUBSCRIBER A | ALL | NONE | ALL | COUPONS |
| SUBSCRIBER B | ALL BUT COMMERCIAL | PUBLISHER A | DOT, MALL A | NONE |

FIG. 6

HIGH-RATE PROXIMITY DETECTION WITH THE ABILITY TO PROVIDE NOTIFICATION

CROSS REFERENCE TO RELATED APPLICATIONS

This application is a continuation of U.S. patent application Ser. No. 10/315,651, filed on Dec. 10, 2002 now U.S. Pat. No. 7,136,658, incorporated by reference herein.

FIELD OF THE INVENTION

The present invention relates to wireless communication systems and, more particularly, relates to messaging over wireless networks.

BACKGROUND OF THE INVENTION

Increasingly, mobile devices, such as cellular telephones, can transmit or receive text messages. For example, the short message service (SMS) is available for cellular phones, facsimile machines and Internet protocol (IP) addresses. The SMS protocol allows small text messages, with a size less than 160 alphanumeric characters, to be communicated to or from a mobile device. Similarly, the wireless application protocol (WAP) is a specification allowing mobile devices to communicate multimedia messages with one another.

Messaging capability extends the functionality of mobile devices and allows mobile users to send additional information to each other. Commercial vendors have also begun to discover that sending messages to mobile devices is beneficial. For example, systems exist where a commercial vendor can send a message to mobile devices proximate the vendor. Nonetheless, there are problems with the current schemes for sending proximity-based messages to mobile devices, and improved techniques are needed that allow messages to be sent to proximate mobile devices.

SUMMARY OF THE INVENTION

Aspects of the present invention provide high-rate proximity detection for mobile devices, and can provide notification to mobile devices determined to be proximate a wireless station.

In one aspect of the invention, techniques are presented for identifying mobile devices that are within a coverage region of a wireless station. Positions for mobile devices, if any, within the coverage region are determined. It is then determined whether the positions are within one or more defined areas, called "notification areas" herein.

In another aspect of the invention, selected mobile devices within notification areas are sent messages. The selected mobile devices are selected via certain criteria, including, for instance, campaign specifications and subscriber information. As an example, a message can be sent to a mobile device if the subscriber corresponding to the mobile device has indicated an acceptance of a category of notifications for the message and for the publisher who is publishing the notifications. The category could be, for example, traffic conditions and the publisher could be, for instance, a Department of Transportation having responsibility for a particular freeway. These are two examples of multiple criteria for selecting mobile devices to which messages could be sent.

A more complete understanding of the present invention, as well as further features and advantages of the present invention, will be obtained by reference to the following detailed description and drawings.

BRIEF DESCRIPTION OF THE DRAWINGS

FIG. 4 is an example of a proximity detection system database, in accordance with one embodiment of the present invention;

FIGS. 5A and 5B are examples of a campaign specification database, in accordance with one embodiment of the present invention;

FIG. 6 is an example of a subscriber information database, in accordance with one embodiment of the present invention.

DETAILED DESCRIPTION OF PREFERRED EMBODIMENTS

Figure 1:
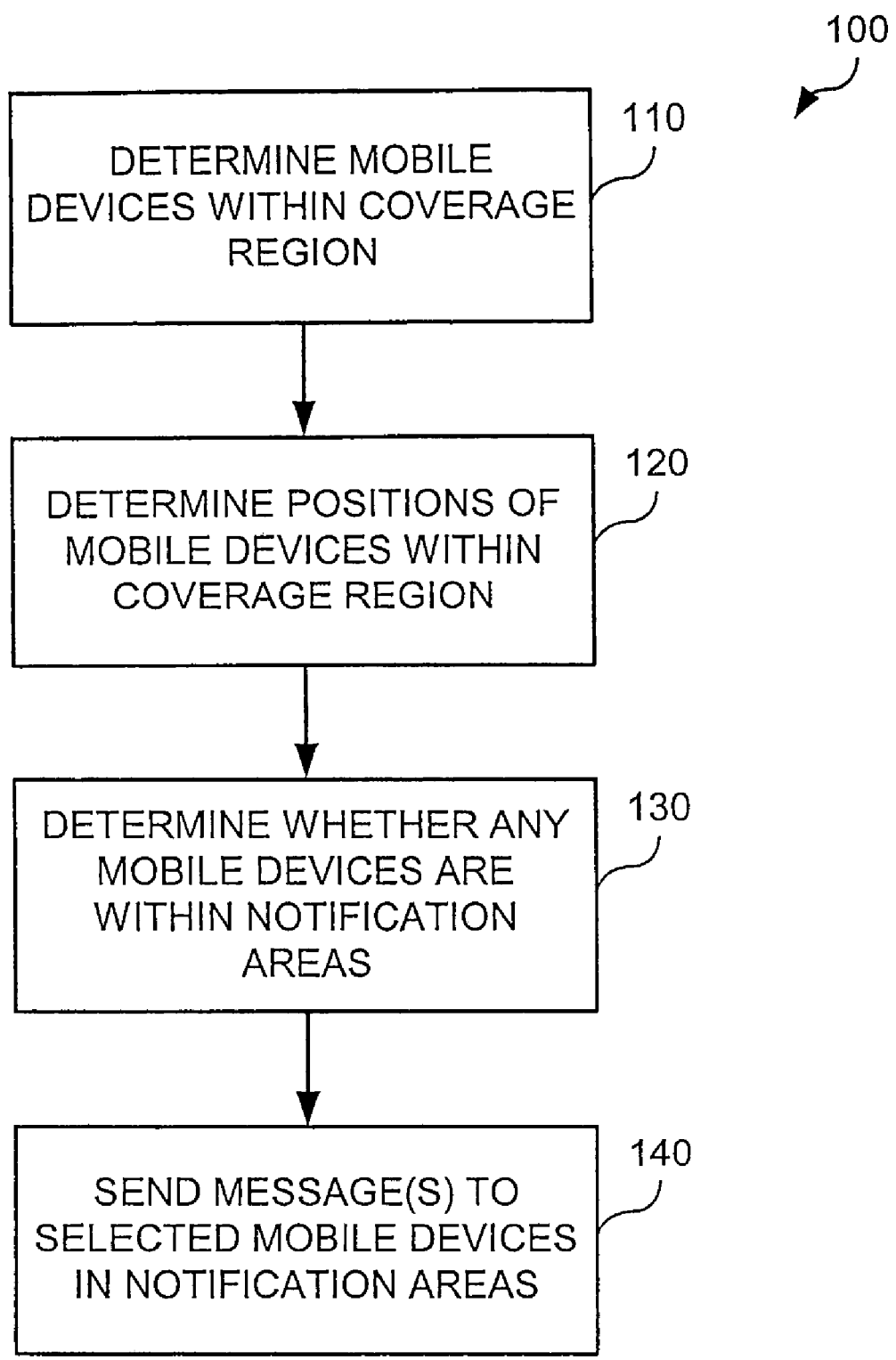
FIG. 1 is a flowchart of a method for proximity detection and for notification of proximate mobile devices, in accordance with one embodiment of the present invention.

The present invention, among other things, satisfies a desired ability to send a text or multimedia message to wireless devices when the wireless devices are determined to be in particular notification areas. There are a number of exemplary scenarios for which the present invention can provide notification: (1) a consumer can be sent a coupon for a new store in a shopping mall when the consumer enters the parking lot for the mall; (2) a consumer can be notified, as the consumer enters a shopping center, that an office supply store has a back-to-school sale that ends in about two hours; (3) tourists can be sent brief multimedia descriptions of the monuments in the Washington, D.C. mall as they enter each area that surrounds a monument; (4) fair-goers can be sent communications of the current events inside the venue they are approaching; (5) drivers who enter a certain section of highway can be notified that construction two miles ahead is causing a backup and they should take a detour; (6) drivers can be notified that, because of severe fog conditions ahead, they should reduce speed immediately; and (7) a message can be sent to all subscribers in a certain area that their water supply will be cut off in half an hour to replace a section of pipe.

To support these applications, a notification system could offer certain capabilities. Some exemplary capabilities are described below, but it should be noted that the present invention is not limited to these capabilities, nor does the present invention need provide all of these capabilities. One such capability, for instance, is precisely defined and arbitrarily located notification areas. In the scenario (1) above, the notification area is defined to be the parking lot of a shopping mall, so that commuters on a nearby highway do not receive the coupon. The shopping mall is a precisely defined notification area. In the Washington tour guide case, scenario (3) above, the areas could be such that tourists approaching the Lincoln Memorial do not receive the description of the Washington Monument. Another desirable capability is the ability to detect entrance to a notification area within a short time period, such as one minute. This is beneficial in order to support notifications for drivers. Yet another desirable capability is the ability to use wireless handsets with automatic position identification capability that will be deployed for Enhanced 911 emergency position service.

There are conventional systems designed for providing these capabilities, but these conventional systems employ an architecture that is not scalable. These conventional systems are formed on a gateway-based architecture for position determination, in which the carrier network provides a server for handling all position requests. Given a terminal identifier (e.g., a subscriber phone number), the server will first determine which mobile switching center (MSC) is serving the user. It will then forward the request to the position-determining technology deployed by that MSC. The global system for mobile communication (GSM) Position Services architecture is an example of such a conventional architecture. See, for instance, the European Telecommunication Standardization Institute (ETSI) technical standard (TS) 101 724 or GSM 3.71, the disclosures of which are hereby incorporated by reference.

The architecture in the cited standards serves common applications that require the occasional position of an individual subscriber, or even the tracking of a small number of subscribers. But because of the gateway architecture, conventional systems using these types of architectures cannot scale to handle a large number of requests, such as thousands or hundreds of thousands of requests per second. Because each request for position has to go through one server, and from that server to local position-determining technologies and then back to the server, it will be very difficult for the server to handle thousands or hundreds of thousands of requests in order to track mobile devices. Some cellular service providers, for example, have millions of subscribers, and tracking all of these subscribers will be problematic using conventional architectures.

The present invention provides methods and apparatus that scale to allow high-rate proximity detection and notification for very large numbers of subscribers.

Certain embodiments of the present invention impose no additional requirements beyond E911 with respect to handsets. The latter requirement is important to carriers because certain embodiments make use of technology which is currently being deployed. In addition to the above capabilities, embodiments of the present invention can address two functional capabilities related to supporting a wide range of applications: a system should support a variety of notification forms, including SMS messages, WAP Push services, and application-specific forms; and notification publishers (e.g., retailers) should have the ability to personalize the notification.

Referring now to FIG. 1, a method 100 is shown for proximity detection and for notification of proximate mobile devices. Method 100 is exemplary and the method 100 provides an overview of the present invention, but additional detail is presented below. Aspects of the present invention take advantage of the natural geographic distribution inherent in wireless networks, and push position queries into the wireless network, close to the positioning technology. This contrasts with the approach of having one central position server that is provided by the wireless carrier to serve less demanding applications.

Method 100 begins in step 110 when mobile devices within a coverage region are determined. It is possible to determine which devices are within a coverage region of a wireless station. For instance, in cellular networks, a base station subsystem can determine which cellular phones are within the coverage region for the base station subsystem. Similarly, an access point can determine which mobile devices are in the coverage region for the access point. A coverage region is an area in which a mobile device and a wireless station can communicate.

In step 120, the positions of the mobile devices within a coverage region are determined. Generally, there is a particular proximity detection technology that services a particular coverage region or perhaps a few coverage regions. By determining the positions of mobile devices within a coverage region with proximity detection technology, the tracking of mobile devices is moved closer to the devices. This reduces the bottlenecks that can occur by having a single server attempting to ascertain positions of mobile devices. Such position detection technology could employ, for example, triangulation or global positioning system (GPS) techniques. Any technology suitable for determining a position of a mobile device may be used.

In step 130, it is determined whether any mobile devices are within notification areas. A notification area is an area defined by a publisher. A notification area can be any arbitrary shape. Notification areas are described in more detail below. Publishers are those entities, such as commercial vendors, who define the notification areas and who also define messages to be sent to those mobile devices in the notification areas. Positions of mobile devices are used to determine whether any mobile devices are within a notification areas.

In step 140, messages are sent to selected mobile devices that are in notification areas. Mobile devices can be selected based on a number of criteria. For example, all mobile devices in a notification area can be selected, regardless of any preferences by publishers or subscribers. As described in more detail below, though, generally some preferences will be used to select mobile devices. As an example, publishers can set different categories, among other criteria. Subscribers who are using mobile devices can opt out or opt into these categories. In the present disclosure, a "subscriber" and a "mobile device" will both be treated as having positions, although it is possible for one subscriber to have multiple mobile devices. In the latter instance, a mobile device being tracked will still have a subscriber and there will generally be subscriber preferences associated with the mobile device. A publisher may desire to send an advertisement to mobile devices in a particular notification area, but a subscriber using a mobile device may opt out of commercial advertisement and, consequently, will not receive the advertisement. Another subscriber, using a different mobile device, might opt into or have no preference regarding commercial advertisements. Thus, this other subscriber will receive the advertisement.

Therefore, method 100 allows notifications to be sent to mobile devices proximate a wireless station. Moreover, method 100 allows high-rate proximity detection, as proximity detection and determination of whether mobiles are in notification areas is spread out instead of being centralized.

Figure 2:
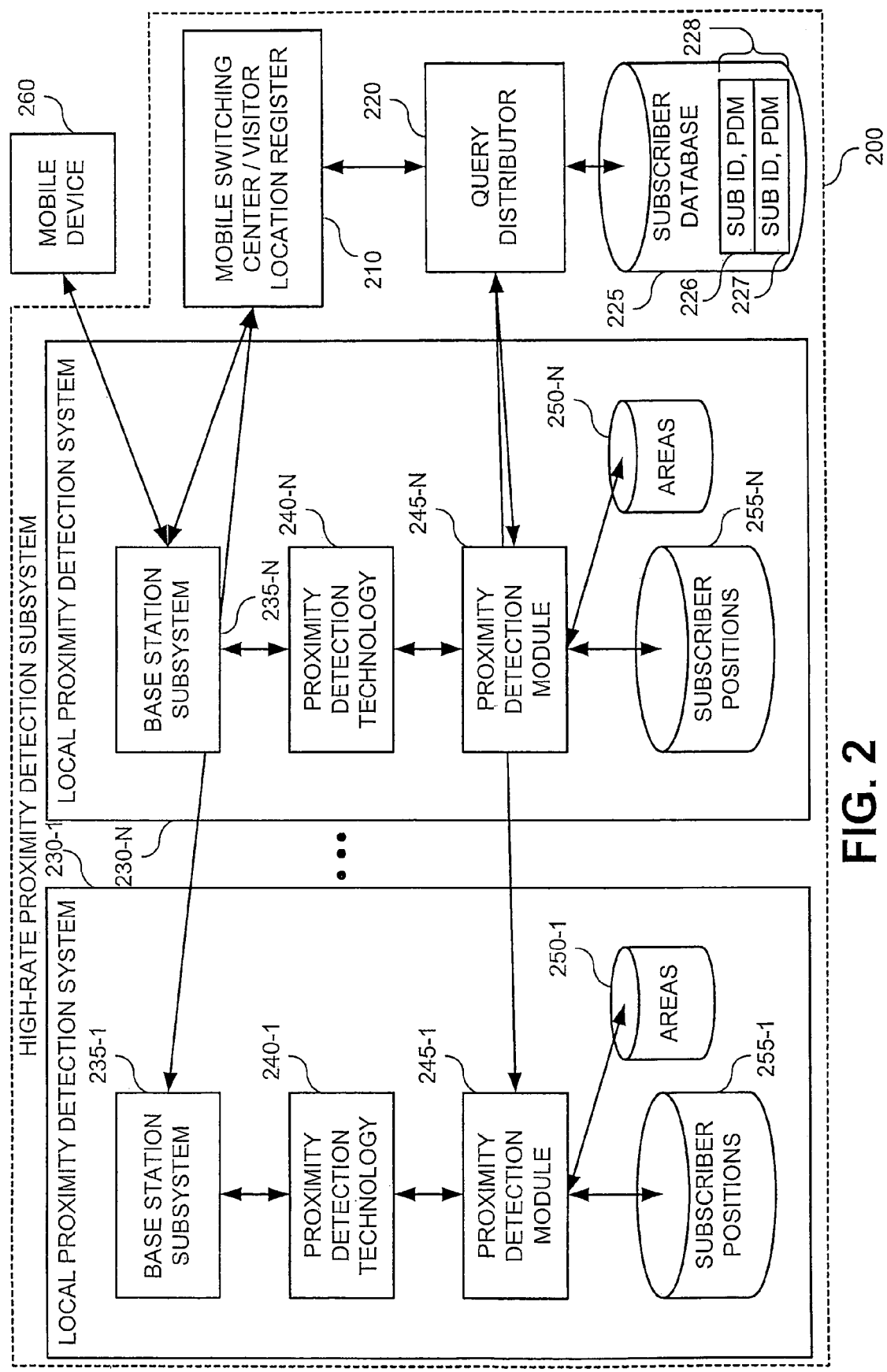
FIG. 2 is a block diagram of a high-rate proximity detection subsystem interacting with a mobile device, in accordance with one embodiment of the present invention.

Referring now to FIG. 2, a high-rate proximity detection subsystem 200 is shown interacting with a mobile device 260. High-rate proximity detection subsystem 200 performs, in this example, steps 110, 120, and 130 of method 100 of FIG. 1. High-rate proximity detection subsystem 200 comprises local proximity detection systems 230-1 through 230-N (collectively, local proximity detection systems 230), a mobile switching center/visitor position register (MSC/VLR) 210, a query distributor 220, and a subscriber database 225. Each local proximity detection system 230 comprises a base station subsystem 235, a proximity detection technology 240, a proximity detection module 245, a notification areas database 250, and a subscriber positions database 255. The subscriber database 225 comprises two subscriber subsets 226 and 227 that comprise a subscriber set 228. It should be noted that terminology has been borrowed from the GSM wireless architecture, but it should be understood that the present invention applies to all wireless networks where a position of a wireless device can be determined.

The number of local proximity detection systems 230 per query distributor 220 and MSC/VLR 210 is usually small, such as several local proximity detection systems 230 per query distributor 220 and MSC/VLR 210.

Each base station subsystem 235, as is known in the art, generally includes a base station controller (not shown) and one or more base transceiver stations (not shown). The area in which a base transceiver station and a mobile device are able to receive signals from each other defines a "cell" in cellular phone terminology. In this example, the base station subsystem 235 is a wireless station and the cell is a coverage region for the wireless station. In the example of FIG. 2, mobile device 260 can communicate with base station subsystem 235-N but cannot communicate with base station subsystem 235-1. Mobile device 260 is therefore within the coverage region of local proximity detection system 230-N but not within the coverage region of local proximity detection system 230-1.

Proximity detection technology 240 is whatever technology is used for proximity detection. This could be timing, triangulation, GPS information, or any other technology for determining position of a mobile device 260. It should also be noted that a simple proximity detection technology 240 such as determining whether a mobile device 260 is within a cell may be suitable for some applications. The present invention will beneficially operate regardless of the type of proximity detection technology 240 used.

Each proximity detection module 245 communicates with the position detection technology 240 and the query distributor 220. If there are multiple proximity detection modules 245 deployed for a position area served by the MSC/VLR 210, then a query distributor 220 will serve multiple proximity detection modules 245. In this context, a position area of MSC/VLR 210 comprises the set of coverage areas defined by the base station subsystems 235.

The query distributor 220 has, in certain embodiments, the responsibility of periodically directing a proximity detection module 245 to obtain the positions of a set of currently served subscribers. The query distributor 220 may obtain this set from the MSC/VLR 210 or it may obtain the set from the base station subsystem 235. The query distributor 220 may also maintain a subscriber database 225, if desired, that contains the set 228 of currently served subscribers. In the case of multiple proximity detection modules 245 serving a position area of the MSC/IVLR 210, subscriber identifiers obtained from the MSC/NVLR 210 will be accompanied by the base station subsystem 235 serving each subscriber. The query distributor 220 maintains an association of base station subsystem 235 to proximity detection module 245, allowing the query distributor 220 to split the set of subscriber identifiers into subsets 226, 227, each subset 226, 227 containing only those subscribers served by the base station subsystem 235 to which the proximity detection module 245 is associated via the proximity detection technology 240.

For the example of FIG. 2, a set 228 of currently served subscribers is divided into two subsets 226, 227 of currently served subscribers. The query distributor 220 has, in this example, stored these subsets 226, 227 in subscriber database 225, although subscriber database 225 is not required. For local proximity detection system 230-N, the subset 226 could be the subscriber identifier "subID260" for "SUB ID" portion of the subset 226 for the mobile device 160. Subset 226 also comprises another identifier (such as "PDM245-N"), shown as "PDM" in FIG. 2, to correlate the subscriber identifier of "subID260" with the local proximity detection system 230-N. The subset 227 of currently served subscribers for the local proximity detection system 230-1 is a null set, as there are no currently served subscribers within the coverage region of the local proximity detection system 230-1. Thus, subset 227 would be a null subscriber identifier and another identifier (such as "PDM245-1") to correlate the null subscriber identifier with the local proximity detection system 230-1.

A query distributor 220 may, alternatively, maintain a database (not shown) that associates a base station subsystem 235 with the local proximity detection system 230 serving the base station subsystem 235. When a subscriber identifier obtained from the MSC/VLR is accompanied by the serving base station subsystem 235, this database facilitates the distribution of positioning queries to the local proximity detection systems 230.

A proximity detection module 245 may be associated with multiple proximity detection technologies 240, for flexibility in deployment. Also, a query distributor 220 may obtain its set 228 of currently-served subscribers directly from the base station subsystem 235. Furthermore, the query distributor 220 may obtain the set 228 of subscribers in various ways. For example, query distributor 220 may obtain the set 228 of subscribers by periodic direct request, or it may receive them via update events from the base station subsystem 235 or query distributor 220. The precise nature of the interface depends on the network interfaces exposed by a particular carrier implementing the base station subsystem 235 and MSC/VLR 210.

Each, in certain embodiments, proximity detection module 245 maintains a notification areas database 250, which contains the mobile devices that lie within the coverage region served by the proximity detection module 245. Each record in the database comprises the geometry (e.g., in geographical coordinates) of a notification area and a unique identification of that notification area. This is described in more detail below. Additional information may include a start time indicating when a notification area becomes active, and a stop time indicating when the notification area becomes inactive. The proximity detection module 245 may use this information to locally manage the lifetime of notification areas.

Given a set 228 of subscribers, a proximity detection module 245 will periodically direct a corresponding proximity detection technology 240 to compute positions of subscribers in a corresponding subset 226, 227 and therefore positions of mobile devices corresponding to the subscribers. The direction may occur through a normal interface (not shown) from the proximity detection technology 240 for position requests, or the proximity detection technology 240 may offer a separate interface (not shown) for tracking requests. For each subscriber position, stored in subscriber positions database 255, received from the proximity detection technology 240, the proximity detection module 245 will query a corresponding notification areas database 250 to determine which, if any, notification areas the subscriber lies within. For each notification area the subscriber lies within, the proximity detection module 245 sends a "proximity" message to another module, which is discussed below.

The proximity detection module 245 is, in one embodiment, responsible for determining that the proximity detection module 245 has already detected the entrance of a particular subscriber to a particular notification area and, therefore, not sending duplicate "proximity" messages. The proximity detection module 245, in certain embodiments, is also responsible for detecting when a subscriber has exited an area.

Since the proximity detection technology 240 will generally continue to handle conventional position requests forwarded by the MSC/VLR 210, the proximity detection module 245 may, as an additional function to make handling of the conventional position requests more efficient, maintain a subscriber positions database 255 storing the last subscriber position computed. The proximity detection technology 240 will then simply forward position requests to the proximity detection module 245. Or, the proximity detection module 245 may present a proximity detection technology 240 interface (not shown) to the MSC/VLR 210.

Figure 3:
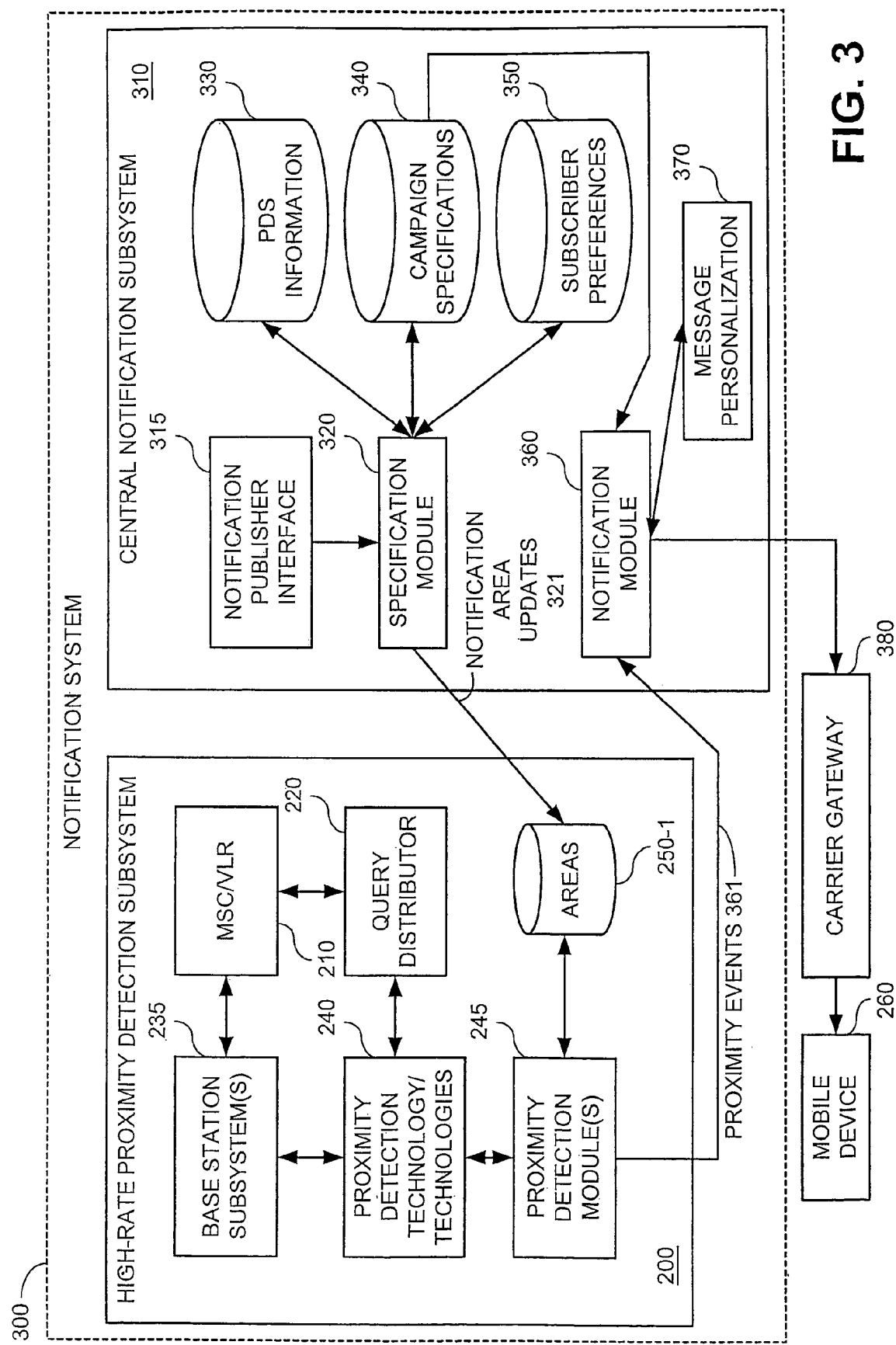
FIG. 3 is a block diagram of a notification system interacting with a carrier gateway and a mobile device, in accordance with one embodiment of the present invention.

Turning now to FIG. 3, a notification system 300 is shown. Notification system 300 interacts with a carrier gateway 380, which interacts with a mobile device 260. The notification system 300 comprises the high-rate proximity detection subsystem 200 as described in FIG. 2 and central notification subsystem 310. The central notification subsystem 310 comprises a notification publisher interface 315, a specification module 320, PDS information database 330, a campaign specifications database 340, a subscriber preferences database 350, a notification module 360, and a message personalization module 370. In this example, central notification system 310 performs step 140 of FIG. 1, which is sending messages to selected mobile devices that are in a notification area.

Publishers of notification areas create campaign specifications and enter these campaign specifications via the notification publisher interface 315. Notification publisher interface 315 may be implemented, for instance, as a Web page or an applet. The campaign specifications are received by the specification module 320, which stores them in a campaign specifications database 340. Campaign specifications database 340 is described in more detail in reference to FIGS. 5A and 5B. Each campaign specification, as described in more detail below, comprises in this example the following: (a) a publisher identification (ID); (b) a campaign ID; (c) one or more notification areas for the campaign; (d) a message of some form to be delivered to a subscriber; (e) an indication of the type of the method (e.g., SMS or WAP Push) used to transmit the message; (f) a start time indicating when the campaign is to begin; (g) a stop time indicating when the campaign should end; (h) information indicating the category of campaign, such as whether its purpose is commercial and promotional, commercial and informational (e.g., tourism), entertainment, traffic, or emergency or any combination thereof; and (i) specification of a message-customization mechanism, to be described below. It should be noted that these are only examples and a campaign specification may contain different, more, or less information than what has been and will be described.

For each campaign specification received, the specification module 320 determines the affected high-rate proximity detection subsystems 200 by comparing the notification areas in the specification (e.g., stored in campaign specifications database 340) to the coverage regions of the high-rate proximity detection subsystems 200, recorded in PDS information database 330. An example PDS information database 330 is shown in FIG. 4. For each high-rate proximity detection subsystem 200 whose coverage region intersects the notification areas in the specification, the specification module 320 sends the notification area database 250 updates for that high-rate proximity detection subsystem 200. These updates comprise, for example, sending notification area updates 321 to the high-rate proximity detection subsystem 200. The notification area updates 321 generally comprise notification areas and their associated notification area IDs, start times, and end times, as described in more detail in reference to FIG. 5.

Proximity events 361 sent from the high-rate proximity detection subsystem 200 to the notification module 360, in certain embodiments, comprise a subscriber ID (not shown) and notification area ID (not shown). Any events suitable to alert a system that a mobile device is within (or perhaps has left) a proximity of wireless station are suitable. The notification module 360 looks up an associated campaign specification in the campaign specifications database 340 using the notification area ID and composes a notification according to the information in the returned campaign specification. Notification module 360 then, optionally, applies subscriber preferences stored in subscriber preferences database 350 to determine if the subscriber wishes to receive this notification. For each subscriber known to the system, the subscriber preferences database 350 records, as shown in more detail in FIG. 6, the following: (a) what categories of notifications the subscriber is interested in (e.g., using the same set of categories used by publishers); (b) what publishers the subscriber does not want to receive notifications from; (c) what exceptions, if any, to (b) the subscriber has registered, and (d) what specific campaigns the subscriber has registered for. The preceding were only examples, and a subscriber preferences database 350 may have different, more, or less information than that described.

Thus, a proximity event 361 such as "<subID, areaID>"could be known by the notification module 360. The notification module 360 may also determine the campaign ID (e.g., "campID"), the publisher ID (e.g., "pubID"), and the category associated with the areaID. The notification module 360 also optionally determines, for a subscriber, the accepted categories (e.g., "acceptedCategories"), blocked publishers (e.g., "blockedPublishers"), the accepted publishers (e.g., "acceptedPublishers"), and accepted campaigns (e.g., "acceptedCampaigns"). The notification module 360 then proceeds with notification, for example, depending on the following: (campaign.category IN acceptedCategories) AND (campaign.publisherID NOT IN blockedPublishers) OR (campaign.publisherID IN acceptedPublishers) OR (campaign.campaignID IN acceptedcampaigns). It should be noted that this formulation is only exemplary and other formulations may be used.

If the publisher has registered a message-personalization directive, the notification module 360 will perform the directive. The directive may consist of a uniform resource locator (URL) for an external host (not shown) that will provide a message personalized for the particular subscriber, or the publisher may have supplied a Java class, in this example the message personalization module 370, that will generate a personalized message. The personalization message may be delivered back to notification module 360 in order for the notification module 360 to transmit the message to the carrier gateway 380. The notification module 360 will then communicate with the carrier gateway 380 in order to deliver the notification. Alternatively, the personalization message may be delivered directly to the carrier gateway 380. The method of communication with the carrier gateway 380 generally depends on the message type.

Notification processors 360 may be replicated for load balancing, using well-known techniques employed in highly loaded web sites.

It should be noted that FIGS. 2 and 3 are exemplary. Entities in these figures may be combined, subdivided, rearranged, or deleted. For instance, the specification module 320 may be combined with the notification module 360. As another example, the specification module 320 may be further subdivided into a module operating on campaign specifications database 340 and subscriber preferences database 350 when determining whether to notify a mobile device 260, and another module operating on PDS information database 330 and campaign specifications database 340 in order to determine whether notification area updates 321 should be sent. As another example, the service adapter 220 could be built into each proximity detection module 245.

Referring now to FIG. 4, an example of a PDS information database 330 is shown. In this example, there are two high-rate proximity detection subsystems 200, which are "PDS 1" and "PDS 2." The coverage region for each high-rate proximity detection subsystem 200 is described via a series of coordinates. Any technique for describing an area may be used. The network address of each high-rate proximity detection subsystem 200 is also given. The network addresses may also be stored as hyper text transfer protocol (HTTP) addresses or other suitable addresses, if desired. As described above, the PDS information database 330 is used to determine to which high-rate proximity detection subsystems 200 notification area updates 321 should be sent.

Referring now to FIGS. 5A and 5B, these figures show an exemplary campaign specifications database 340. As can be seen in FIGS. 5A and 5B, the publisher Mall A has a new store campaign. The mall has an area between a number of coordinates 1 through P. The message is "Mall A is proud to announce the grand opening of Store K, offering 15% off." In this example, the Store K is offering 15 percent off but Mall A has not offered a coupon directly to subscribers. This message is to be delivered via a WAP push, and it is valid between December 10 at 11 a.m. to December 24 at 9 p.m. The category is commercial and the message customization is "message with map," which means that a message will contain a map showing the location of the new store, if the mobile device 260 supports this.

It should be noted that FIGS. 5A and 5B are merely exemplary. Other criteria may be added, and criteria shown in campaign specifications database 340 can be removed. For instance, a cellular phone system may choose to make categories optional. Additionally, there may be multiple entries per publisher. For example, the publisher DOT already has two separate entries shown. In situations where more than one message method and method customization might be performed for a single message, this can be indicated via two entries or a single entry. For instance, Mall A might want to send its message via both SMS and WAP. In this case, the "WAP" message method could be changed to "SMS, WAP" and the "MESSAGE WITH MAP" message customization could be changed to "NONE, MESSAGE WITH MAP" so that SMS uses no message customization but WAP uses "MESSAGE WITH MAP."

Referring now to FIG. 6, an exemplary subscriber preferences database 350 is shown. In this example, subscriber preferences database 350 has two subscribers, subscribers A and B. Subscriber A has accepted all categories, blocked no publishers and accepted all publishers, and has accepted the "COUPONS" campaign from Publisher A. Publisher A publishes a number of different coupons using the "COUPONS" campaign, and Subscriber A has accepted this campaign. On the other hand, Subscriber B has specifically opted out of commercial categories and specifically dislikes Publisher A. However, Subscriber B has opted to receive information from publisher DOT and Mall A. Thus, even though Subscriber B will not, in general, receiver commercial messages, Subscriber B will, under the exemplary formulation given above, receive commercial messages from Mall A.

Figure 7:
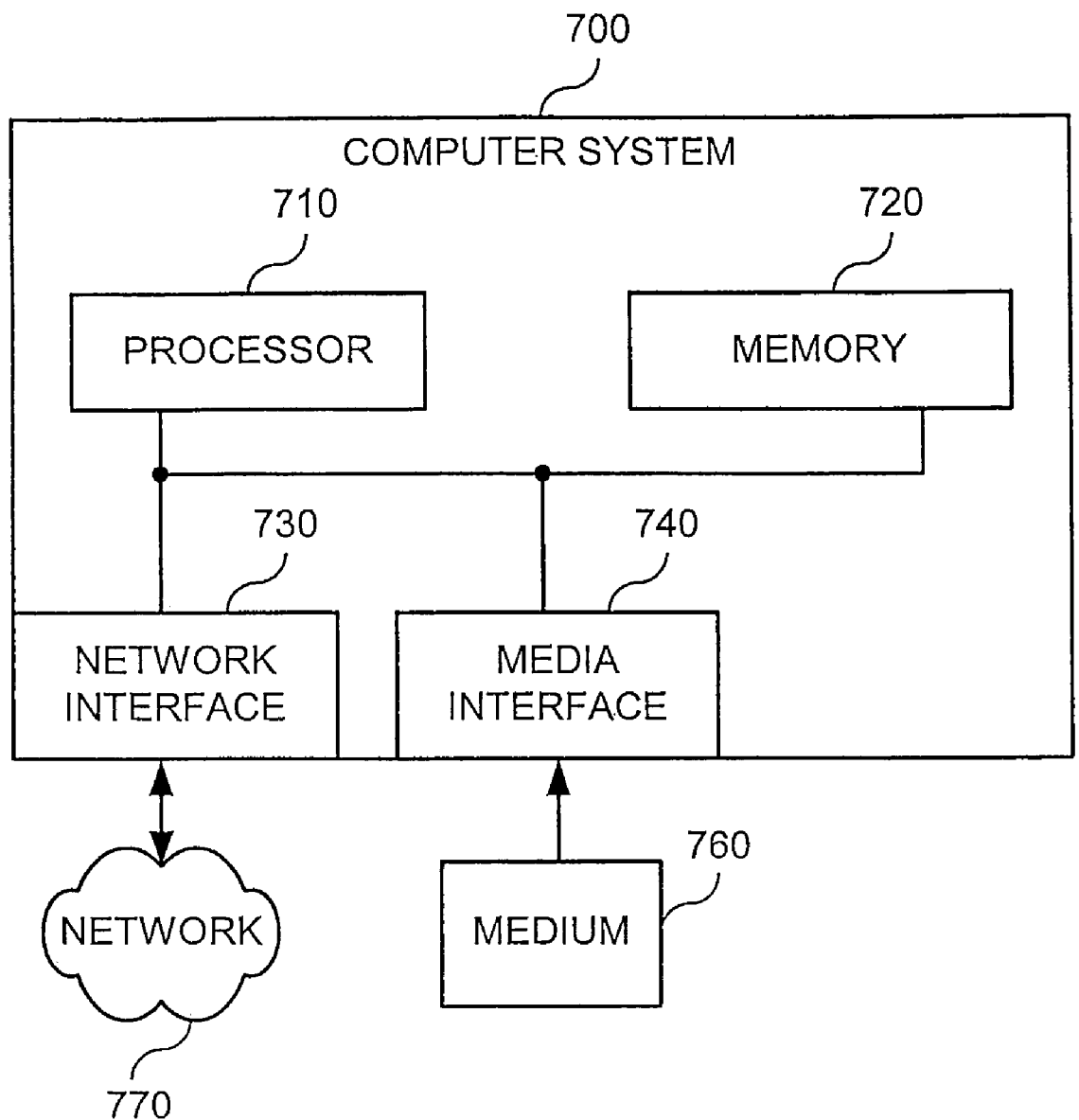
FIG. 7 is block diagram of an exemplary computer system suitable for implementing aspects of the present invention, in accordance with one embodiment of the present invention.

Turning now to FIG. 7, a computer system 700 is shown interacting with a network 770 and a medium 760. Computer system 700 may be used to implement the method steps and apparatus described herein. For instance, computer system 700 may implement the functions of specification module 320 and the notification module 360. Computer system 700 comprises a processor 710, a memory 720, a network interface 730, and a media interface 740.

Processor 710 can be configured to implement the method steps and functions disclosed herein. The memory 720 could be distributed or local and the processor 710 could be distributed or singular. The memory 720 could be implemented as an electrical, magnetic or optical memory, or any combination of these or other types of storage devices. Moreover, the term "memory" should be construed broadly enough to encompass any information able to be read from or written to an address in the addressable space accessed by processor 710. With this definition, information on network 770 is still within memory 720 because the processor 710 can retrieve the information from the network. It should be noted that each distributed processor that makes up processor 710 generally contains its own addressable memory space. It should also be noted that some or all of computer system 700 can be incorporated into an application-specific or general-use integrated circuit.

As is known in the art, the methods and apparatus discussed herein may be distributed as an article of manufacture that itself comprises a machine readable medium, such as medium 760, containing one or more programs which when executed implement embodiments of the present invention. For instance, the machine readable medium may contain a program configured to determine whether the position of a mobile device 260 is within a notification area. The machine readable medium may be a recordable medium (e.g., a hard drive or an optical disk) or may be a transmission medium (e.g., a network 770 comprising fiber-optics, the Internet, or a wireless network using time-division multiple access, code-division multiple access, or other radio-frequency channel). Any medium that can store information suitable for use with a computer system may be used.

It is to be understood that the embodiments and variations shown and described herein are merely illustrative of the principles of this invention and that various modifications may be implemented by those skilled in the art without departing from the scope and spirit of the invention.

What is claimed is:

1. A method for determining a position of one or more mobile devices, the method comprising the steps of:
   identifying mobile devices within a coverage region of a wireless station, wherein one of a plurality of coverage region processors is assigned to the coverage region;
   determining a position for at least one of the mobile devices identified to be within the coverage region of the wireless station; and
   determining whether the position for the at least one mobile device is within one or more defined notification areas within the coverage region, wherein one or more messages are associated with each notification area, wherein said step of determining whether the position for the at least one mobile device is within one or more defined notification areas within the coverage region step is performed by said assigned coverage region processor;

determining whether the at least one mobile device should be sent one or more messages when the at least one mobile device is determined to be within the one or more defined notification areas by using notification criteria; and sending the one or more messages to the at least one mobile device when a determination has been made that the at least one device should be sent a message.

2. The method of claim 1, wherein at least one of the defined notification areas is defined via a plurality of coordinates.

3. The method of claim 1, further comprising the step of sending one or more messages to the at least one mobile device when the at least one mobile device is determined to be within the one or more defined notification areas.

4. The method of claim 3, further comprising the step of determining the one or more messages by accessing a database comprising the one or more messages, wherein the one or more messages correspond to one or more defined notification areas in the database.

5. The method of claim 1, wherein:
the step of identifying mobile devices within a coverage region of a wireless station further comprises the step of periodically identifying mobile devices within a coverage region of a wireless station; and
the step of determining a position for at least one of the mobile devices within the coverage region of the wireless station further comprises the step of periodically determining a position for at least one of the mobile devices within the coverage region of the wireless station.

6. The method of claim 1, wherein the step of determining a position for at least one of the mobile devices within the coverage region of the wireless station further comprises the step of periodically determining positions for all of the mobile devices within the coverage region of the wireless station.

7. The method of claim 1, wherein said notification criteria are one or more of the following: campaign specification criteria and subscriber preferences criteria.

8. The method of claim 7, wherein the campaign specification criteria comprise one or more of a publisher identification (ID), a campaign ID, a notification area, a message, a message method, a start time, a stop time, one or more categories, and a message customization.

9. The method of claim 7, wherein the subscriber preference criteria comprise accepted categories, blocked publishers, accepted publishers, and accepted campaigns.

10. The method of claim 1, further comprising the steps of determining one or more message methods to be used to send the one or more messages and sending the one or more messages by using the determined one or more message methods.

11. The method of claim 1, further comprising the steps of determining one or more message customizations to be used to send the one or more messages and sending the one or more messages by using the determined one or more message customizations.

12. The method of claim 1, wherein a subscriber corresponds to the at least one mobile device.

13. The method of claim 12, wherein:
a first category corresponds to the subscriber;
the one or more defined notification areas correspond to a second category; and
the method further comprises the step of sending one or more messages to the at least one mobile device when the first and second categories match and when the at least one mobile device is determined to be within the one or more defined notification areas.

14. The method of claim 1, further comprising the step of sending a proximity message indicating that the at least one mobile device is within the one or more defined notification areas when the at least one mobile device is determined to be within the one or more defined notification areas.

15. An article of manufacture fox determining a position of one or more mobile devices, comprising:
a computer readable medium containing one or more programs which when executed implement the steps of:
identifying mobile devices within a coverage region of a wireless station, wherein one of a plurality of coverage region processors is assigned to the coverage region;
determining a position for at least one of the mobile devices identified to be within the cover age region of the wireless station;
determining whether the position for the at least one mobile device is within one or more defined notification areas within the coverage region, wherein one or more messages are associated with each notification area, wherein said step of determining whether the position for the at least one mobile device is within one or more defined notification areas within the coverage region step is performed by said assigned coverage region processor;
determining whether the at least one mobile device should be sent one or more messages when the at least one mobile device is determined to be within the one or more defined notification areas by using notification criteria; and
sending the one or more messages to the at least one mobile device when a determination has been made that the at least one device should be sent a message.

16. An apparatus for determining a position of one or more mobile devices, comprising:
a memory; and
at least one processor; coupled to the memory, operative to:
identify mobile devices within a coverage region of a wireless station, wherein one of a plurality of coverage region processors is assigned to the coverage region;
determine a position for at least one of the mobile devices identified to be within the coverage region of the wireless station;
determine whether the position for the at least one mobile device is within one or more defined notification areas within the coverage region, wherein one or more messages are associated with each notification area, wherein said determination of whether the position for the at least one mobile device is within one or more defined notification areas within the coverage region step is performed by said assigned coverage region processor;
determine whether the at least one mobile device should be sent one or more messages when the at least one mobile device is determined to be within the one or more defined notification areas by using notification criteria; and send the one or more messages to the at least one mobile device when a determination has been made that the at least one device should be sent a message.

17. The apparatus of claim 16, wherein the at least one processor is further operative to determine the one or mote messages by accessing a database comprising the one or more messages, wherein the one or more messages correspond to one or more defined notification areas in the database.

18. The apparatus of claim 16, wherein the at least one processor is further operative:
when identifying mobile devices within a coverage region of a wireless station, to periodically identify mobile devices within a coverage region of a wireless station; and
when determining a position for at least one of the mobile devices within the coverage region of the wireless station, to periodically determine a position for at least one of the mobile devices within the coverage region of the wireless station.

19. The apparatus of claim 16, wherein the at least one processor is further operative, when determining a position for at least one of the mobile devices within the coverage region of the wireless station, to periodically determine positions for all of the mobile devices within the coverage region of the wireless station.

20. The apparatus of claim 16, wherein said notification criteria are one or more of the following: campaign specification criteria and subscriber preferences criteria.

21. The method of claim 1, wherein each of said defined areas is associated with one or more notification servers, and wherein each notification server is associated with one or more geographic regions.

22. The article of manufacture of claim 15, wherein each of said defined areas is associated with one or more notification servers, and wherein each notification server is associated with one or more geographic regions.

23. The apparatus of claim 16, wherein each of said defined areas is associated with one or more notification servers, and wherein each notification server is associated with one or more geographic regions.

* * * * *